United States Patent
Yared et al.

(10) Patent No.: US 6,452,940 B1
(45) Date of Patent: Sep. 17, 2002

(54) MOBILE STATION MIGRATION FROM D-AMPS PACKET SYSTEM TO EDGE/GPRS PACKET SYSTEM IN AN INTEGRATED WIRELESS NETWORK

(75) Inventors: Marlene Yared; Sara Mazur, both of Bromma; Jan Lindskog, Pixbo, all of (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 0 days.

(21) Appl. No.: 09/282,434

(22) Filed: Mar. 31, 1999

(51) Int. Cl.[7] .......................... H04J 3/16; H04L 12/28; H04Q 7/00
(52) U.S. Cl. ...................... 370/465; 370/401; 370/329; 455/445
(58) Field of Search ................................ 370/331, 329, 370/338, 401, 349, 465, 336, 337, 442; 455/448, 436, 445, 466, 552, 434

(56) References Cited

U.S. PATENT DOCUMENTS

| | | | |
|---|---|---|---|
| 5,502,721 A | 3/1996 | Pohjakallio | 370/60.1 |
| 5,784,362 A | 7/1998 | Turina | 370/321 |
| 6,314,108 B1 * | 11/2001 | Ramasubramani et al. | 370/465 |
| 6,347,091 B1 * | 2/2002 | Wallentin et al. | 370/437 |
| 6,356,759 B1 * | 3/2002 | Mustajarvi | 455/450 |

FOREIGN PATENT DOCUMENTS

WO    WO95/16330    6/1995

OTHER PUBLICATIONS

"Radio Interface Performance of EDGE, a Proposal for Enhanced Data Rates in Existing Digital Cellular Systems", Peter Schramm et al., VTC '98, 48th IEEE Vehicular Technology Conference, Pathway to a Global Wireless Revolution (Cat. No. 98CH36151), Ottawa, Ont., Canada May 18–21, 1998, pps. 1064–1068, XP002116967.

"UWC–136 RTT Update—Recommendation, Review and Adopt. Updates to UWC–136 Based on the Change of Modulation for 136 HS Outdoor to 8–PSK", Universal Wireless Communications Consortium, Feb. 26, 1999, pps. 1–306, XP002116968.

* cited by examiner

*Primary Examiner*—Nay Maung
*Assistant Examiner*—Raymond Persino
(74) *Attorney, Agent, or Firm*—Burns Doane et al.

(57) ABSTRACT

The present invention describes a method of migrating a mobile station, operating within an integrated D-AMPS/EDGE wireless telecommunication network, from the D-AMPS packet portion of the network to the EDGE/GPRS packet portion of the network. The technique includes accessing the control channels of both the D-AMPS and EDGE networks in order to obtain the necessary timing advance and packet transfer identifier for use with the GPRS packet system. In an embodiment of the invention, the MS makes a first access on a D-AMPS control channel to obtain a pointer to a reserved radio block on an EDGE packet control channel. The MS makes a second access on the EDGE control channel as specified by the reserved radio block which contains a particular frequency and timeslot location. The MS then sends a series of shortened bursts to the network such that a Timing Advance Index (TAI) value is calculated from the bursts and sent back to the MS. A packet data channel (PDCH) is assigned by the network and sent to the MS to perform the packet data transfer using the estimated TAI and assigned TFI.

20 Claims, 3 Drawing Sheets

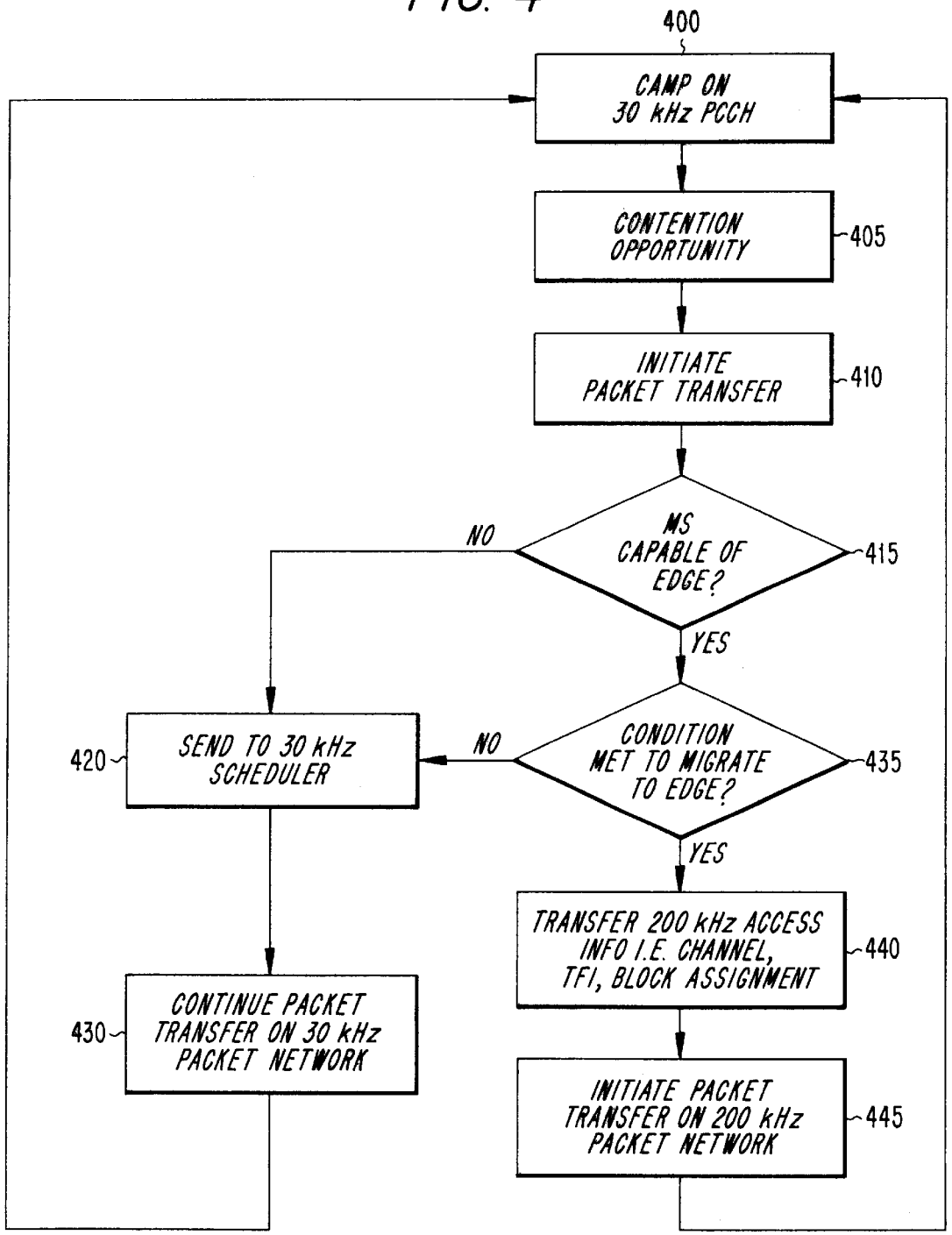

MOBILE STATION MIGRATION FROM D-AMPS PACKET SYSTEM TO EDGE/GPRS PACKET SYSTEM IN AN INTEGRATED WIRELESS NETWORK

FIELD OF THE INVENTION

The present invention relates generally to wireless telecommunication networks, more specifically, the invention relates to a method of packet system access for migration in an integrated D-AMPS/EDGE wireless telecommunication network.

BACKGROUND OF THE INVENTION

The evolution of wireless telecommunication systems has led to continuing improvements in quality, capacity, and added functionality as compared to prior generations. One area of added functionality has been the introduction of packet switched data services such as General Packet Radio Service (GPRS) specified for use with the Global System for Mobile Communications (GSM) wireless standard. The implementation of packet switched services in wireless telecommunications allows for the introduction of a number of new data based services in current generation systems, e.g., enhanced support for Internet communications. Packet switched techniques provide a significant improvement in efficiency for utilizing radio resources relative to conventional circuit switched techniques.

Packet switched connections are an especially suitable means for transmitting data (including voice data) over the air interface since radio resources are only reserved when the data or voice data, which are divided into packets, need to be sent. Resources are relinquished and made available to other users during breaks between the packets thereby freeing up radio spectrum during periods of non-use. Further gains in efficiency are achieved by sharing resources among users by having multiple users share the same time slot. In contrast, conventional circuit switched techniques allocate radio resources for the entire time of the transmission. A comprehensive description of GPRS and packet data communications is given in PCT publication WO/9516330 entitled: "Apparatuses and Mobile Stations for Providing Packet Data Communication in Digital TDMA Cellular Systems", published on Jun. 15, 1995 with a priority date of Dec. 10, 1993 and assigned to the present assignee, the disclosure of which is incorporated herein by reference.

An example in the trend toward wireless evolution has been the development of the Enhanced Data Rates for GSM Evolution (EDGE) which is currently under standardization within the European Telecommunication Standards Institute (ETSI). The EDGE specification has also been selected by the Universal Wireless Communications Consortium (UWCC), as the outdoor high speed data component of UWC-136, as a common evolution path for IS-136 Digital Advanced Mobile Phone System (D-AMPS) and GSM to support high-bit-rate wireless data services such as simultaneous voice, internet services, and video at transmission up to speeds of 384 kbps (48 kbps per timeslot). The EDGE specification, using the GPRS backbone as a core network, provide packet data communications based on the current GSM Time Division Multiple Access (TDM) frame structure, logical channel structure and 200 kHz carrier bandwidth. The UWCC selected component for D-AMPS evolution provides support for the seamless transition between the D-AMPS modulated channels (in which the air interface standard provides for 30 kHz carrier bandwidth) and EDGE modulated channels, thus also enabling multi-mode operation comprising both circuit switched and packet switched services.

A UWCC requirement, in compliance with IMT-2000 criterion, designates in the specification for EDGE channels that they are to be deployed for operation within one megahertz (1 MHz) of frequency spectrum. The relatively confined frequency range of 1 MHz necessitates the use of a ⅓ frequency reuse cell plan for effective operation. As known by those skilled in the art, the cell plan is indicative of the frequency reuse distance between cells and wherein the farther the distance, the lesser the probability of experiencing co-channel interference. But a problem resulting from the use of a ⅓ cell plan is that the radio environment is poor i.e. channel link interference levels are too high for the reliable use of common control signaling on the 200 kHz network. Therefore, it becomes extremely difficult to rely solely on 200 kHz common control signaling in this environment to manage mobile station (MS) migration from the 30 kHz packet portion of the network to the 200 kHz GPRS packet portion of the network for packet transfers, for example. Consequently, one method would be to access to access the 30 kHz control channels, in addition to accessing the 200 kHz control channels, in order to facilitate migration.

However, in an integrated D-AMPS/EDGE network, there are some intrinsic incompatibilities that exist between the 30 kHz and 200 kHz networks involving the Medium Access Control (MAC) layer which pose particular problems for the smooth migration between the packet systems. In particular, issues that involve obtaining timing advance and packet transfer identifiers for packet transfers on the first network prior to migration to the second network in order to successfully operate on the second network are particularly problematic.

The MAC layer provides the important function of arbitrating access to the shared medium between a plurality of MSs and the network i.e. it provides mediation between multiple MSs attempting to transmit simultaneously and provides collision avoidance, detection and recovery procedures etc. Timing advance involves the adjustment in the transmissions between the MS and the base station (BS) such that propagation delays are compensated for as the MS moves farther away from the BS. But since timing scales are different between the networks i.e. the length of the time slots on the 30 kHz network and 200 kHz network are different, timing advance acquired on the one network is typically not valid on the other. For packet transmissions, the GPRS packet system requires a Timing Advance Index (TAI), which is obtained when the MS sends an access burst in which the network can derive the correct timing advance. Typically, this can only be obtained from the 200 kHz network in which an MS operating on the D-AMPS network ordinarily does not have access to.

Similarly, the packet transfer identifier i.e. the Active Mobile Identifier (AMI) on the 30 kHz D-AMPS packet portion of the network is generally not compatible with the Temporary Flow Identifier (TFI) used in the GPRS/EDGE packet portion of the network. This is because a packet identifier on one packet system uniquely identifies a specific packet transfer by the network that assigned it. Thus, an AMI assigned on the 30 kHz network D-AMPS packet portion of the network will not be recognized by the to 200 kHz GPRS packet system.

In view of the foregoing, it is an objective of the present invention to provide an access method that provides means for acquiring the information necessary to successfully migrate from the D-AMPS packet portion of the network to migrate to the GPRS/EDGE based packet portion of the network.

SUMMARY OF THE INVENTION

Briefly described, and in accordance with an embodiment thereof, the invention discloses a method of migrating a mobile station (MS) camping on or in packet transfer mode on a Digital Advanced Mobile Phone System (D-AMPS) 30 kHz modulated channel to an Enhanced Data Rates for GSM Evolution (EDGE) 200 kHz modulated channel. In accordance with an embodiment of the invention, the method includes an access sequence performed by the MS in two steps. In a first access step, the MS accesses the 30 kHz D-AMPS control channel, and if it is determined that a migration to the 200 kHz EDGE/GPRS packet system is necessary, the MS acquires information directing the it to a radio block reserved on the 200 kHz EDGE control channel. The radio block specifies a specific frequency and timeslot for said access by the MS. In the second access step, the MS accesses the EDGE control channel as specified by the acquired reserved block wherein thereon the MS sends a series of shortened access bursts to the network. The network uses the shortened bursts to estimate a Timing Advance Index (TAI) that is transmitted back to the MS together with a Temporary Flow Identity (TFI) that is assigned to the packet transfer. Furthermore, the network then assigns a packet data channel for use by the MS in packet mode in preparation for a packet transfer.

The present invention describes a technique for migrating a multi-mode MS camping on or in packet transfer mode on a D-AMPS modulated channel to the General Packet Radio Service (GPRS) network operating on an EDGE modulated channel. The two-step access, occurring first on the D-AMPS control channel and then on the EDGE control channel, provides a solution to the problem of obtaining the necessary information for GPRS packet transfers, i.e. associated timing advance and packet identifier of the transfer. These and other advantages of the present invention will become apparent upon reading the following detailed description and studying the various figures of the drawings.

BRIEF DESCRIPTION OF THE DRAWINGS

The invention, together with further objects and advantages thereof, may best be understood by reference to the following description taken in conjunction with the accompanying drawings in which:

FIG. 4 shows an exemplary flow diagram of the MS migration process.

DETAILED DESCRIPTION OF THE PREFERRED EMBODIMENTS

In the following description, for purposes of explanation and not limitation, specific details are set forth, such as particular circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

For relatively long packet transfers, it is desirable to migrate a mobile station (MS) operating on the 30 kHz D-AMPS network to the higher bit-rate 200 kHz GPRS packet system for data intensive applications such as, e.g., internet and video services etc. In accordance with the invention, a two-step access procedure is performed by the MS such that an initial access occurs on the D-AMPS network followed by a second access to the GPRS/EDGE based packet system.

Figure 1:
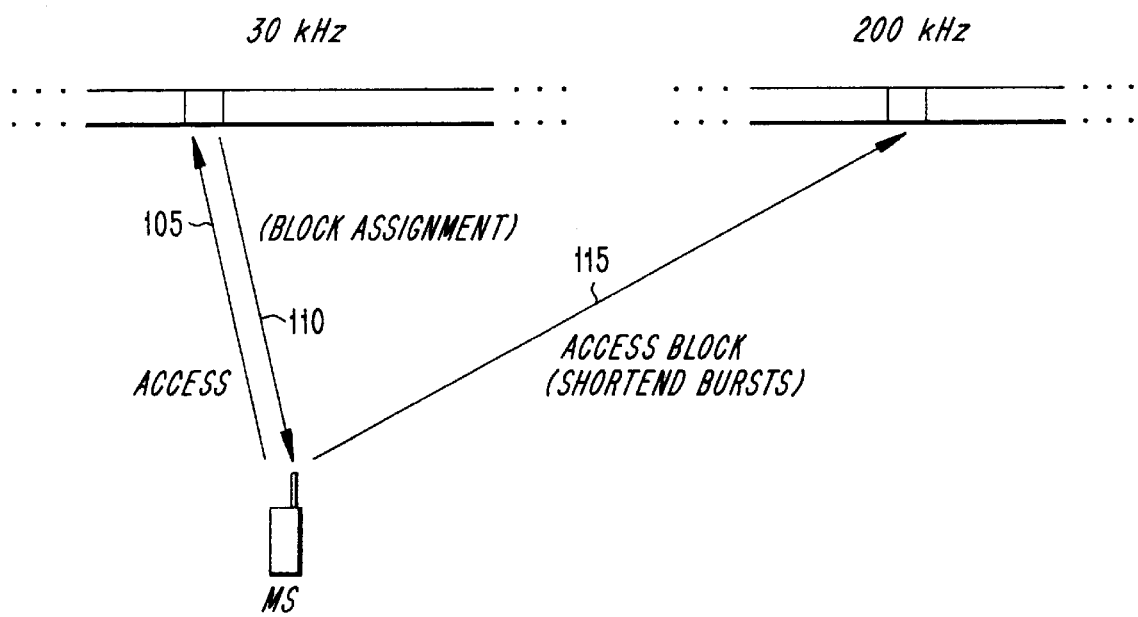
FIG. 1 illustrates the concept of a two-step control channel access by an MS operating in accordance with the present invention.

FIG. 1 is an exemplary two-step access procedure illustrating the concept put forth by the present invention. A situation is shown wherein an MS initially camped in packet mode on the 30 kHz D-AMPS network is induced to migrate to the 200 kHz EDGE/GPRS network. This may be based on an attribute of the packet transfer, for example the packet transfer length (transaction size), since longer packet transfers can be more efficiently handled by the 200 kHz EDGE/GPRS packet system. The MS, while operating on the D-AMPS network, initiates a packet transfer by making a packet transfer request on the 30 kHz packet control channel (PCCH), as shown by reference numeral 105. In one aspect, the MAC entity associated with the 30 kHz network, typically residing primarily in the base station (BS), determines whether a MS has EDGE capability and should be offloaded to the 200 kHz GPRS packet system. The 30 kHz MAC entity manages the MS transition to the 200 kHz GPRS packet system by determining a suitable radio block (block assignment), comprising a specific frequency and time slot on a control channel, on the 200 kHz GPRS packet system, should offloading become necessary. A new message via the BS containing the block assignment to the MS to inform it that a radio block has been reserved for subsequent access on the 200 kHz EDGE/GPRS packet system, as shown in 110. The block assignment procedure may be performed, for example, by directing the MS to a predetermined location on the 200 kHz GPRS packet system reserved for this purpose. To proceed with the packet transfer, the MS accesses the 200 kHz control channel (in a second access step), as shown in 115, in accordance with the block assignment received in the first access step.

Figure 2:
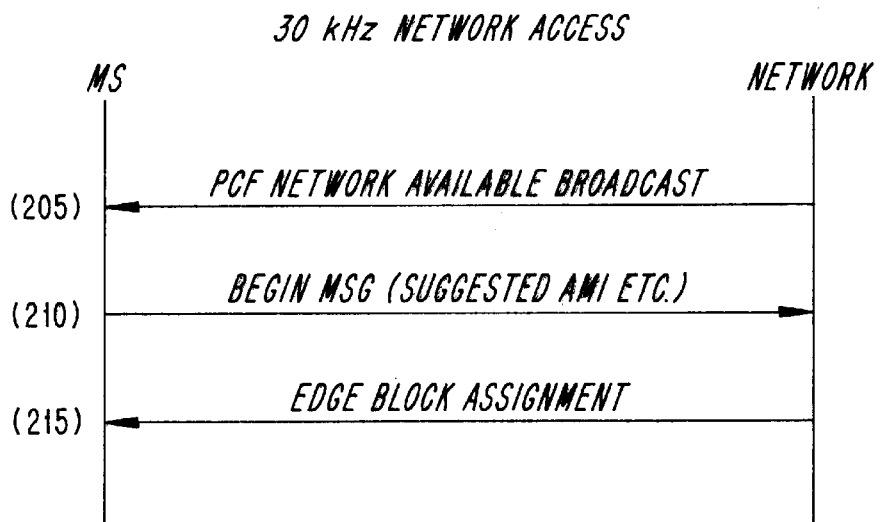
FIG. 2 shows an exemplary signal diagram associated with the first access step.

FIG. 2 shows an exemplary signal diagram associated with the first 30 kHz access step in accordance with an embodiment of the present invention. In step 205, the network broadcasts to all MSs to indicate that the network is available for packet transfers by contending MSs. The MSs are notified of the network's availability by an indicator in the Packet Channel Feedback (PCF) field transmitted on a time slot which the MSs routinely monitor. In this way, the PCF field is used to manage shared uplink access on the packet data channel. Both contention and reservation based accesses are supported on the uplink such that when the PCF field indicates an idle state for contention based access, any MS is able to attempt access on the next available uplink slot. In step 210, a first access step is performed by a BEGIN message sent by the MS to indicate the start of a series of data packets are to follow (also shown in 105 of FIG. 1). The BEGIN message includes information such as mobile identification, type of modulation etc., which can be included in Radio Resource Management type messages such as a Channel Assignment message, for example. Further included in the BEGIN message is a suggested Active Mobile Identity (AMI), which is uniquely assigned by the MS, to identify a particular data packet to the 30 kHz packet system. As known by those skilled in the art, the corresponding data packet identifier used in the 200 kHz GPRS packet system is the Temporary Flow Identity (TFI) for uniquely identifying packet transfers.

Also included in the information sent by the MS to the network is a volume indicator that is indicative of the transaction size of the pending packet data transfer. A determination may be made by the 30 kHz network to migrate the MS to the 200 kHz GPRS packet system based on, for example, the packet transaction size. This is can be significant because the GPRS packet system typically is more suitable to handle longer packet transfers thereby improving the operating efficiency. For instance, the network may initiate a migration to GPRS packet system based on an attribute of the packet transfer such as, e.g., the transaction size. As an example, a threshold may be defined such that a transaction size of under, e.g., 63 segments characterizes the packet transfer as being a "bounded" transaction. This indicates that the MS is not able to append additional data to the transfer thereby making it a relatively short transfer that is preferably performed by the 30 kHz packet system. Analogously, a transaction size above the threshold indicates that the transfer is an "unbounded" session wherein additional data may be appended to the transfer. In an "unbounded" transaction, the MS is preferably offloaded to the 200 kHz GPRS packet system to perform the packet transfer. It should be understood that the use of 63 segments was put forth to illustrate an exemplary threshold that is practical under some conditions but the threshold may be configurable to suit specific performance requirements.

However, the criteria for offloading the MS to the higher capacity GPRS packet system can be based on other criteria such as, for example, mobile preferences, current load of the 30 kHz packet traffic channels, current load of the 200 kHz EDGE packet traffic channels, channel quality on the 30 kH or 200 kHz networks, and the prior packet transfer transaction size set by the current mobile or other candidates. Once the network determines that a the MS should be migrated to the 200 kHz EDGE channels, an EDGE BLOCK ASSIGNMENT is sent to the MS on the 30 kHz PCCH comprising a radio block reserved on the 200 kHz network, as shown in step 215 (shown in 110 of FIG. 1). The radio block contains a specified frequency and timeslot for the MS in order to access the 200 kHz packet data network. In the preferred embodiment, the radio block refers to a predefined location on the 200 kHz control channels used exclusively for initial access. This requires that the radio block is kept free at all times for this purpose. It is also possible to redirect the initial access to different radio blocks in order to more efficiently utilize radio resources. Using this technique, an inquiry of free resources on 200 kHz would then generally be required by, for example, the 30 kHz network prior to sending the EDGE BLOCK ASSIGNMENT.

Figure 3:
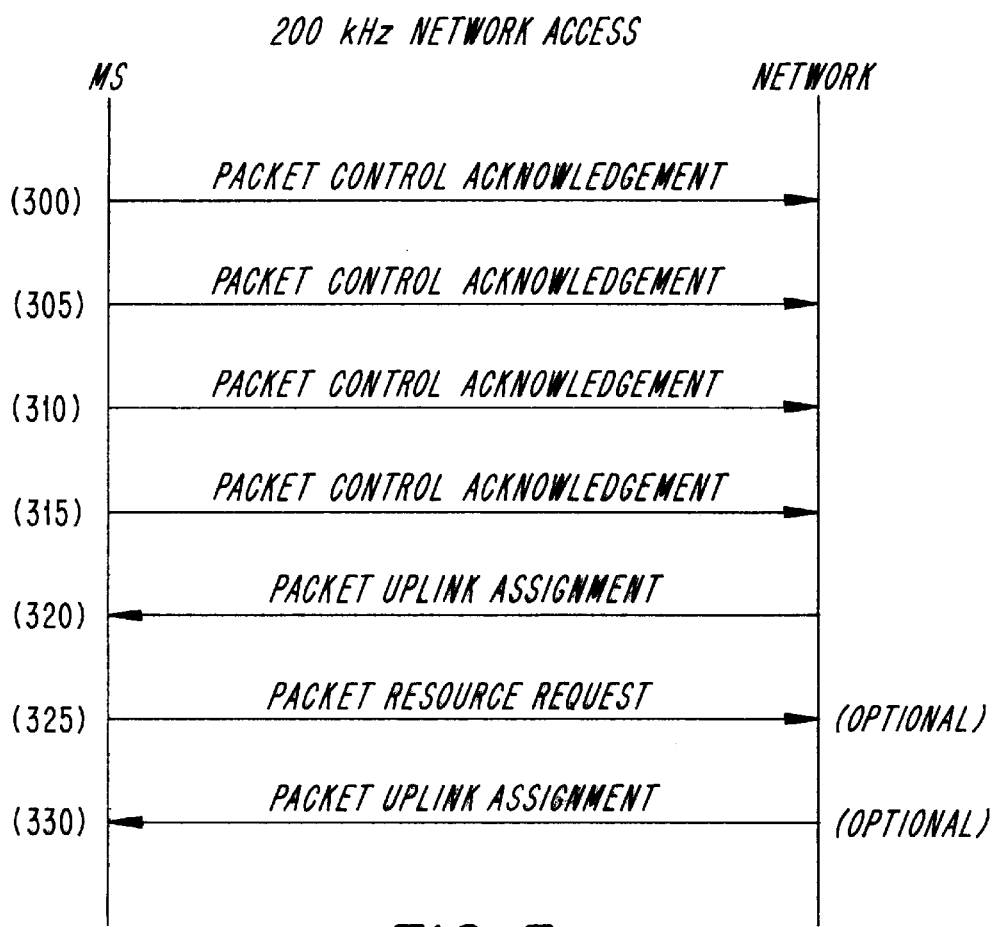
FIG. 3 shows an exemplary signal diagram associated with the second access step.

Referring now to FIG. 3, a signal diagram illustrating a second access step made now on the 200 kHz packet system is depicted. Based on the reserved radio block, the MS makes four consecutive shortened PACKET CONTROL ACKNOWLEDGEMENT access bursts on the reserved block in accordance with standard GPRS procedures, as shown in steps 300, 305, 310, and 315 respectively (shown in 115 of FIG. 1). The shortened bursts permit the network to estimate the timing advance for the MS in packet transfer mode. The timing advance procedure is used to derive the correct value for timing advance that the MS must use for the uplink transmission of radio blocks. Timing advance is performed for initial timing advance estimation and for continuous updating in order to correct for variances in propagation delay as the MS moves relative to the BS.

In step 320, the network responds with a PACKET UPLINK ASSIGNMENT message which contains the estimated timing advance value i.e. the Timing Advance Index (TAI) and a Temporary Flow Identity (TFI) for delivery to the MS. Without a valid TAI, the MS is typically not permitted to send normal bursts on the uplink until it receives a valid timing advance i.e. packet transfers are not permitted. The MS uses the TAI on all uplink transmissions until it is updated by the continuous timing advance procedure which derives new timing advance values based on analysis by the network on received access bursts from the MS on the Packet Data Traffic Channel (PDTCH). A new timing advance value is typically sent via a downlink signaling message. The TAI sent by the BS to the MS is a time offset in bits wherein the MS is instructed to advance its uplink transmissions to the BS by the timing advance relative to the assigned time slot. This compensates for propagation delays incurred when the MS is transmitting far away from the BS. Furthermore, the PACKET UPLINK ASSIGNMENT contains information on reserving resources on the PDTCH for the packet transfer. Regarding the TFI, the network assigns a unique identifier for a particular packet transfer as part of the transfer process. The TFI assignment proceeds in accordance with standard GPRS procedures on the 200 kHz network and is typically used by the network and MS to identify a particular block flow or packet transfer.

The PACKET UPLINK ASSIGNMENT sent to the MS reserves resources with default settings, which include parameters describing the requested resources, that are sufficient for a typical packet transfer (step 320). The case where the MS achieves permission to access the packet system with the default settings is referred to as a one phase GPRS access. If the MS requires any changes in the settings, such as changing the radio link control default setting from acknowledged mode to unacknowledged mode for example, an optional PACKET RESOURCE REQUEST message is sent to the network, as shown in step 325. The network then responds by sending a PACKET UPLINK ASSIGNMENT indicating resources were reserved with the requested changes in the default settings prior to proceeding with the packet transfer, as shown in step 330.

FIG. 4 is a flow diagram of an exemplary migration process from the 30 kHz packet system to the 200 kHz packet system for a mobile originated packet transfer. At step 400, the MS is initially camped on the 30 kHz packet system awaiting either a circuit switched or packet switched page from the network. In step 405, the MS enters into contention with other mobiles for packet resources in order to perform a packet transfer. In step 410, the MS initiates a packet transfer by sending a BEGIN message to the 30 kHz packet system that includes information regarding mobile capability and other attributes such as transaction size, suggested AMI, modulation etc. sent in a Channel Assignment message. The serving BS then determines whether to accept the AMI based on whether it is occupied with another transaction and whether the mobile should be migrated to another packet system, for example. In step 415, an inquiry is made to determine if the MS is multi-mode and capable of operating on the EDGE network. If the MS is not multi-mode capable, the queued packet transfer is performed by the scheduler to sort the packets to be transmitted, as shown in step 420. An optional acknowledgment may be sent to indicate that the packet transfer will be completed on the 30 kHz packet system. In step 430, the packet transfer is continued on the 30 kHz packet system using the previously obtained channel assignment comprising the assigned AMI, frequency assignment, etc. After completing the packet transfer, the MS returns to camping on the 30 kHz packet system in step 400.

If the MS is capable of operating on the EDGE network, a determination, in step 435, is made as to whether the condition for migration has been met i.e. if it would be more efficient to offload the packet transfer to the GPRS 200 kHz packet portion of the network. This condition can be based on the transaction attribute of being "bounded" or "unbounded", transaction size of the pending transfer, or other criteria such as mobile preferences, channel quality, or current load of the packet channels on the 30 kHz or 200 kHz networks etc., as mentioned earlier. If it is determined that the packet transfer should be performed on the 30 kHz packet system, such as for a relatively short transaction size, the transfer is handed over to the 30 kHz scheduler (step 420). When a determination is made that migration to the EDGE packet system is appropriate, a channel is assigned together with a TFI, EDGE block assignment comprising the specified frequency and time slot on the 200 kHz packet system control channel for the MS to access, is shown in step 440. In the second step of the two-step access procedure, the MS accesses the 200 kHz network in according to the block assignment and initiates the packet transfer, as shown in step 445. Similarly, after completing the packet transfer, the MS returns to camping on the 30 kHz packet system in step 400.

The present invention describes a method of accessing the packet data network in an integrated D-AMPS/EDGE telecommunication network. The two step access procedure involving accessing networks on both frequency carriers provides a method, that is transparent to the user, for migrating an MS from the D-AMPS 30 kHz packet system to the GPRS packet system operating on 200 kHz EDGE modulated channels. While camping on the D-AMPS network, the method permits the acquisition of a suitable TAI and TFI for use on the GPRS/EDGE network and facilitates the assignment of a data traffic channel in preparation for a packet transfer, when a determination to migrate the MS is made.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a wireless telecommunication network providing packet switched data services, wherein said network comprises a first packet system operating on a first carrier bandwidth and a second packet system operating on a second carrier bandwidth, a method of migrating a mobile station (MS) between said packet systems comprising the steps of:

accessing a control channel by the MS on said first carrier bandwidth associated with the first packet system;

reading information directing the MS to a reserved radio block on a control channel on said second carrier bandwidth associated with the second packet system;

acquiring a packet identifier associated with a packet transfer for use on the second packet system; and accessing said reserved radio block on the second carrier bandwidth by the MS such that a series of access bursts are performed to acquire timing information for use on the second packet system.

2. A method according to claim 1 wherein the first packet system operates on the first carrier bandwidth of 30 kHz and the second packet system operates on the second carrier bandwidth of 200 kHz.

3. A method according to claim 1 wherein said acquired radio block specifies a particular frequency and timeslot on said second carrier bandwidth.

4. A method according to claim 1 wherein said performed access bursts are shortened access bursts.

5. A method according to claim 1 wherein said acquired packet identifier is a Temporary Flow Identity (TFI) sent from the network to the MS.

6. A method according to claim 1 wherein said information associated with a packet transfer is a Timing Advance Index (TAI) sent from the network to the MS.

7. A method according to claim 1 wherein a packet data traffic channel is further acquired for the transfer of packet data on the second packet system.

8. A method of migrating a multi-mode mobile station (MS) camping on a packet system operating on a 30 kHz carrier bandwidth to a packet system operating on a 200 kHz carrier bandwidth, said method comprising the steps of:

accessing a 30 kHz carrier bandwidth control channel to acquire information pointing to a radio block reserved on a 200 kHz carrier bandwidth control channel;

performing a series of access bursts on said 200 kHz carrier bandwidth control channel as directed by said reserved radio block;

estimating a Timing Advance Index (TAI) from said access bursts for use with an associated packet transfer on said 200 kHz packet system;

assigning a Temporary Flow Identity (TFI) that uniquely identifies a packet transfer on said 200 kHz packet system; and assigning a packet channel on said 200 kHz packet system for use by the MS for said packet transfer.

9. A method according to claim 8 wherein said accessing of the 30 kHz carrier bandwidth control channel is a packet control channel (PCCH).

10. A method according to claim 8 wherein said bursts in said performing access burst step are at series of four shortened access bursts.

11. A method according to claim 8 wherein the estimating a Timing Advance Index step is performed in accordance with standard General Packet Radio Service (GPRS) procedures.

12. A method according to claim 8 wherein the assigning a Temporary Flow Identity step is performed in accordance with standard General Packet Radio Service (GPRS) procedures.

13. A method according to claim 8 wherein said packet channel is a packet data traffic channel.

14. In a integrated wireless telecommunication network comprising a D-AMPS packet system operating on a first carrier bandwidth and an EDGE/GPRS packet system operating on a second carrier bandwidth, a method of performing a packet transfer having a specified transaction size between the network and a mobile station (MS) comprising the steps of:

determining an appropriate packet system for which to carry out the packet transfer;

accessing a control channel associated with said D-AMPS system on the first carrier bandwidth by said MS and obtaining a radio block reserved on a EDGE/GPRS control channel on the second carrier bandwidth when the appropriate packet system is determined to be the EDGE/GPRS packet system, else packet transfer is performed on the D-AMPS packet system;

performing a series of accesses bursts on the EDGE/GPRS control channel if directed by said reserved radio block;

estimating a Timing Advance Index (TAI) based on said bursts by said EDGE/GPRS system;

assigning a Temporary Flow Identity (TFI) to uniquely identifies a specific packet transfer on said EDGE/GPRS system; and performing a packet transfer on an assigned packet channel.

15. A method according to claim 14 wherein the D-AMPS packet system operates on the first carrier bandwidth of 30 kHz and the EDGE/GPRS packet system operates on the second carrier bandwidth of 200 kHz.

16. A method according to claim 14 wherein the determining step is based on the packet transaction size.

17. A method according to claim 14 wherein, in the determining step, the packet transfer is performed on the D-AMPS packet system when the packet transfer is characterized as a "bounded" transaction.

18. A method according to claim 14 wherein, in the determining step, the packet transfer is performed on the EDGE/GPRS packet system when the packet transfer is characterized as an "unbounded" transaction.

19. A method according to claim 14 wherein said acquired radio block specifies a particular frequency and timeslot on said second carrier bandwidth.

20. A method according to claim 14 wherein said series of bursts are four shortened access bursts.

* * * * *